United States Patent [19]

Dubois

[11] 4,037,345
[45] July 26, 1977

[54] FISHING LURE BLADE

[76] Inventor: Eugene Dubois, 1057 Sunshine, Baker, La. 70714

[21] Appl. No.: 656,154

[22] Filed: Feb. 9, 1976

Related U.S. Application Data

[63] Continuation-in-part of Ser. No. 567,526, April 14, 1975.

[51] Int. Cl.² ............................................. A01K 85/00
[52] U.S. Cl. ................................ 43/42.13; 43/42.14; 43/42.4; 43/42.5
[58] Field of Search .................. 43/42.11, 42.13, 42.14, 43/42.06, 42.51, 42.19, 42.4, 42.5, 42.45

[56] References Cited

U.S. PATENT DOCUMENTS

| | | | |
|---|---|---|---|
| 1,503,400 | 7/1924 | Webb | 43/43.13 |
| 1,996,477 | 4/1935 | Lauby | 43/42.19 |
| 2,281,578 | 5/1942 | Heddon | 43/42.13 |
| 2,797,519 | 7/1957 | Keller | 43/42.06 |
| 3,187,457 | 6/1965 | Karisch | 43/42.06 |
| 3,257,750 | 6/1966 | Shannon | 43/42.5 |
| 3,500,573 | 3/1970 | Hudson | 43/42.11 |

FOREIGN PATENT DOCUMENTS 718,666  11/1954  United Kingdom .................. 43/42.5

*Primary Examiner*—Warner H. Camp

[57] ABSTRACT

A body member has a fishhook projecting from one end and a guard assembly projecting from the other end. The guard assembly has buoyant blades swivelly attached to the free ends thereof.

1 Claim, 4 Drawing Figures

FISHING LURE BLADE

BACKGROUND OF THE INVENTION

Related Applications

This application is a continuation-in-part patent application of U.S. Pat. Application Ser. No. 567526 entitled "Artificial Fishing Lure and Spinner" filed Apr. 14, 1975, by the inventor herein. Specific reference to my earlier filed U.S. application is made for the purpose of receiving benefit of said earlier filing date as provided for by 35 USC 120.

Field of the Invention

This invention relates to blades used on artificial underwater spinning lures for fishing.

Prior Art

A typical underwater spinning lure will be composed of a blade rotatably connected to a non-rotatable body section which is designed to imitate the action of a swimming small shad, perch or similar fish when the lure is being moved through the water. More particularly, the blades are designed to imitate the fins of the shad, perch or similar small fish. Typically, the blades are constructed of thin metal strips having an oblong shape with a concave and convex surface which spins or rotates about a swivel connection attached to the lure's body section. An example of one type of common blade can be seen in U.S. Shannon Pat. No. 3257750.

While most blades do to some degree imitate the action of a swimming shad, perch or similar fish, difficulties arise during retrieval of the lure particularly when the lure retrieval rate is reduced.

Another problem arises when using a spinning lure in shallow water. If the lure is allowed to hesitate, it quickly sinks to the bottom which not only eliminates its usefulness as a fishing lure, but also increases the likelihood that the lure could get snagged on the water bottom.

SUMMARY OF THE INVENTION

It is therefore an object of this invention to provide a blade which will assist a spinner lure to more closely imitate the action of a shad, perch or similar fish.

A further object of this invention is to provide a lure that reduces the chances of snagging the water bottom, particularly when being used in shallow water.

Other objects and advantages of this invention will become obvious from the ensuing descriptions of the invention.

Accordingly, a blade for use on an underwater artificial fishing lure is provided which comprises an oblong body section constructed of materials having a density sufficiently small whereby the body has a density less than the water in which the lure is to be used.

BRIEF DESCRIPTIONS OF THE DRAWINGS

PREFERRED FEATURES OF THE INVENTION

Figure 1:
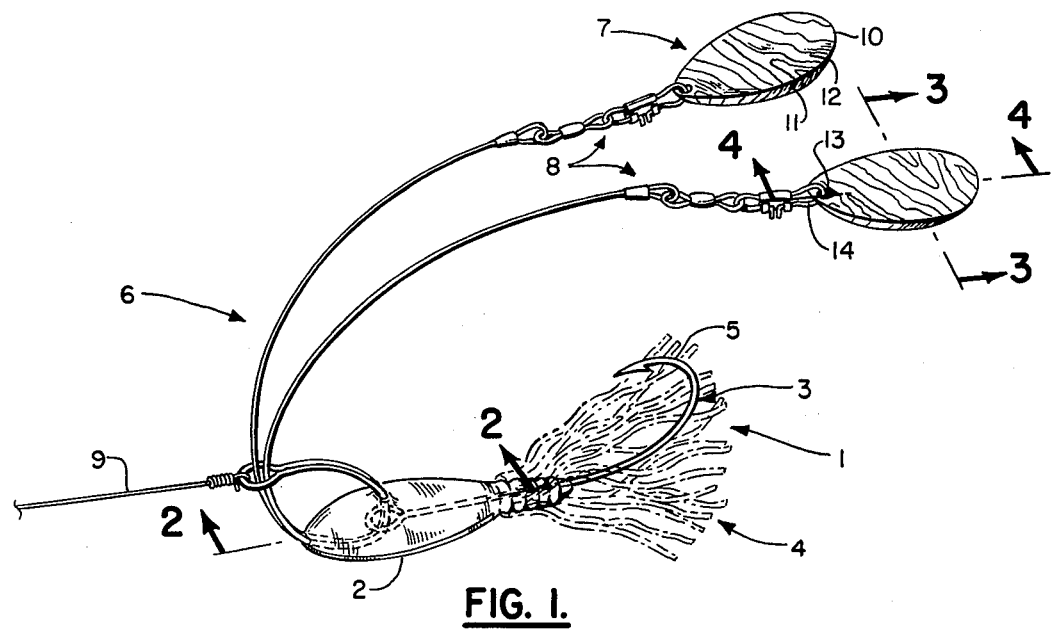
FIG. 1 is a perspective view of one embodiment of a spinner of this invention attached to an underwater fishing lure.
Figure 2:
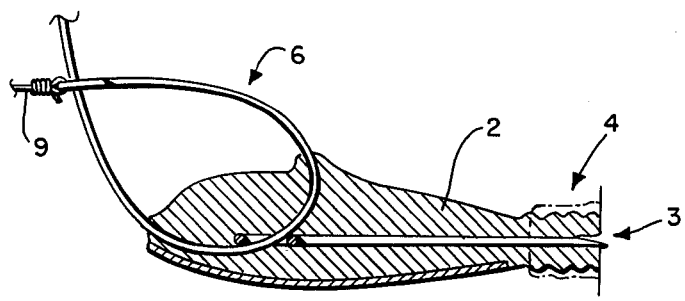
FIG. 2 is a cross-sectional view taken along lines 2 — 2 of FIG. 1.
Figure 3:
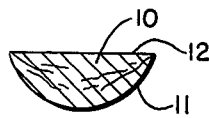
FIG. 3 is a cross-sectional view taken along lines 3 — 3 of FIG. 1.
Figure 4:
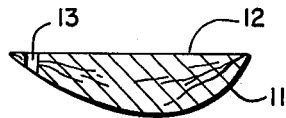
FIG. 4 is a cross-sectional view taken along lines 4 — 4 of FIG. 1.

Referring now to FIGS. 1 and 2, the typical underwater fishing lure 1 has a body means 2, a hook assembly 3 attached to body means 2, skirt assembly 4 attached to one end of body means 2 and extendable about barbed point section 5 to partially camouflage barbed point section 5, guard assembly 6 to which blades 7 are rotatably attached to swivel assemblies 8.

As lure 1 is pulled through the water by line 9, the action of the water past blades 7 cause them to rotate about swivel assembly 8, and their motion causes movement by body means 2 whereby the entire action of lure 1 will imitate the swimming action of a shad, perch or similar fish. However, in priorunderwater lures problems occur during slow retrieval or during reduction of retrieval speed because prior art blades and lures had a tendency to either drop too rapidly in the water or create motion dissimilar to that of the fish being imitated. It has now been discovered that better "action" is obtained if blades 7 are constructed of materials, such as wood, or plastic which can have a hollow center cavity, whereby the spinner has a density less than that of the water where the lure is being used.

Preferably, blades 7 will have a body 10 of oblonged shape with one concave surface 11 adjacent an about flat surface 12. In this embodiment, no or little loss of the desired "action" is lost during normal retrieval, however, during slow retrieval or reduction in retrieval rates, lure 1 does not sink too rapidly and blades 7 are maintained in proper position relative to body means 12 position.

Blades 7 will also be provided with openings 13 to which swivel clip means 14 can attach.

In a more preferred feature, blade 7 will be of a size and constructed of materials having a density whereby when attached to lure 1, lure 1 will neither float nor sink during periods of no retrieval.

In another preferred feature, blade 7 will be constructed from wood which is impregnated with an oil that emits a scent that attracts fish.

There are, of course, many obvious alternates, such as the material blades 7 are constructed from, which are intended to be included within this invention.

What I claim is:

1. In a fishing lure used in water having a body means, a hook assembly attached to one end of said body means, a guard assembly attached to said body means' other end, the improvement to which comprises a blade attached to said guard assembly, said blade being constructed from material having a density sufficiently small to cause said blade's density to be less than said water's density, said blade being attached to said guard assembly by a swivel assembly, said blade comprises a body section having an oblong shape formed by a concave surface adjacent to a flat surface, said body section having one end narrower than the other, said swivel assembly connecting to said narrow end.

* * * * *